(12) United States Patent
Kwon et al.

(10) Patent No.: US 11,574,430 B2
(45) Date of Patent: Feb. 7, 2023

(54) METHOD AND SYSTEM FOR CREATING ANIMAL TYPE AVATAR USING HUMAN FACE

(71) Applicant: LINE Plus Corporation, Seongnam-si (KR)

(72) Inventors: Soon Ho Kwon, Seongnam-si (KR); Geum Yong Yoo, Seongnam-si (KR); Yongseon Yim, Seongnam-si (KR); JongHun Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/067,159

(22) Filed: Oct. 9, 2020

(65) Prior Publication Data

US 2021/0027514 A1    Jan. 28, 2021

Related U.S. Application Data

(63) Continuation of application No. PCT/KR2018/004337, filed on Apr. 13, 2018.

(51) Int. Cl.
| | | |
|---|---|---|
| *G06T 13/40* | (2011.01) | |
| *G06T 15/20* | (2011.01) | |
| *G06F 16/22* | (2019.01) | |
| *G06K 9/00* | (2022.01) | |
| *G06V 40/10* | (2022.01) | |
| *G06V 40/16* | (2022.01) | |

(52) U.S. Cl.
CPC .......... *G06T 13/40* (2013.01); *G06F 16/2228* (2019.01); *G06T 15/205* (2013.01); *G06V 40/10* (2022.01); *G06V 40/165* (2022.01); *G06V 40/171* (2022.01); *G06T 2215/16* (2013.01)

(58) Field of Classification Search
None
See application file for complete search history.

(56) References Cited

U.S. PATENT DOCUMENTS

2013/0077874 A1*  3/2013  Suzuki ............... H04N 1/00336
                                                    382/218
2015/0125049 A1*  5/2015  Taigman .............. G06T 15/205
                                                    382/118
(Continued)

FOREIGN PATENT DOCUMENTS

JP       3090472 U      12/2002
JP     2005-078590 A     3/2005
(Continued)

OTHER PUBLICATIONS

Acuity Training, "Morphing Human Faces With Animal Faces in Photoshop", Jul. 10, 2015, Adobe Photoshop, Guides & Tips, https://web.archive.org/web/20170614060539/https://www.acuitytraining.co.uk/news-tips/morphing-human-faces-with-animal-faces-in-photoshop/[Dec. 9, 2021 6:54:02 PM] (Year: 2015).*

(Continued)

*Primary Examiner* — Tize Ma
(74) *Attorney, Agent, or Firm* — Sughrue Mion, PLLC

(57) ABSTRACT

Disclosed are methods, systems and apparatuses for creating an animal-shaped avatar using a human face. An avatar creation method according to example embodiments includes analyzing an image including a human face and automatically creating an animal-shaped avatar corresponding to the human face.

16 Claims, 6 Drawing Sheets

(56) References Cited

U.S. PATENT DOCUMENTS

2018/0240281 A1* 8/2018 Vincelette ............... G06T 17/00
2019/0266807 A1* 8/2019 Lee ....................... G06T 11/001

FOREIGN PATENT DOCUMENTS

| KR | 10-2004-0106844 A | 12/2004 |
| KR | 10-2005-0101068 A | 10/2005 |
| KR | 10-2007-0036857 A | 4/2007 |
| KR | 10-1081494 B1 | 11/2011 |
| KR | 10-2016-0083900 A | 7/2016 |

OTHER PUBLICATIONS

International Search Report for PCT/KR2018/004337, dated Mar. 4, 2019.

* cited by examiner

Basic model for "rabbit"　　　Basic model for "cat"　　　Basic model for "puppy"

METHOD AND SYSTEM FOR CREATING ANIMAL TYPE AVATAR USING HUMAN FACE

CROSS-REFERENCE TO RELATED APPLICATION

This application is a continuation application of, and claims priority from International Application PCT/KR2018/004337, which has an International filing date of Apr. 13, 2018, the disclosure of which is incorporated herein by reference in its entirety.

BACKGROUND

1. Field

Apparatuses, systems, and methods according to example embodiments relate to creating an animal-shaped avatar using a human face, and more particularly, to an avatar creation method that may analyze an image including a human face and may automatically create an animal-shaped avatar corresponding to the human face, a computer apparatus for performing the avatar creation method, and a non-transitory computer-readable record medium storing instructions to computer-implement the avatar creation method in conjunction with a computer.

2. Description of Related Art

An avatar may refer to a visual image used to represent a user in cyberspace. For example, the avatar may refer to a virtual graphic character that represents the user in community sites, Internet chats, shopping malls, online games, and the like. In the related art, a user-based avatar is created by three-dimensionally scanning a user through a three-dimensional (3D) scanner and creating a 3D avatar image of the user based on the created pattern data.

SUMMARY

Example embodiments provide an avatar creation method that includes analyzing an image including a human face and automatically creating an animal-shaped avatar corresponding to the human face, a computer apparatus for performing the avatar creation method, and a non-transitory computer-readable record medium storing instructions to computer-implement the avatar creation method in conjunction with a computer.

According to an aspect of an example embodiment, there is provided an avatar creation method including: creating a plurality of first measurement value sets respectively corresponding to a plurality of animal images, each of which includes a corresponding animal face, by quantifying the corresponding animal face in each of the plurality of animal images; storing, in a database, each of the plurality of first measurement value sets in association with a corresponding animal classification from among a plurality of animal classifications; creating a plurality of basic models respectively corresponding to the plurality of animal classifications; determining an animal classification, from among the plurality of animal classifications, which corresponds to a human face by receiving a second measurement value set created by quantifying the human face and by comparing the second measurement value set and the plurality of first measurement value sets stored in the database; identifying a basic model from among the plurality of basic models which corresponds to the determined animal classification; and processing the identified basic model based on the second measurement value set to provide an animal-shaped avatar corresponding to the human face.

The creating of the plurality of first measurement value sets may include extracting measurement values with respect to facial components of the corresponding animal face in each of the plurality of animal images, and the second measurement value set may be created by extracting measurement values with respect facial components of the human face.

The creating of the plurality of first measurement value sets may include determining the animal classification by analyzing the plurality of animal images using a deep learning model and by classifying an animal included in each of the plurality of animal images.

Two first measurement value sets from among the plurality of first measurement value sets may be stored in the database in association with a common animal classification, and the creating of the plurality of basic models may include determining, for the common animal classification, an average value of elements corresponding to each other in the two first measurement value sets and creating a synthesized basic model corresponding to the common animal classification based on a set of the determined average values.

The determining of the animal classification may include determining n animal classifications corresponding to m measurement value sets in descending order of similarity by sequentially comparing the second measurement value set and the plurality of first measurement value sets stored in the database, each of n and m denoting a natural number, and the identifying of the basic model may include identifying n basic models created for the n animal classifications, respectively.

The avatar creation method may further include creating a final model by synthesizing the identified n basic models, and the processing the identified basic model may include processing the final model to provide the animal-shaped avatar corresponding to the human face.

The processing of the identified basic model may include modifying a numerical value corresponding to the identified basic model based on the second measurement value set and customizing the identified basic model according to the human face.

According to an aspect of an example embodiment, there is provided an avatar creation method including: receiving an image including a human face from a user terminal over a network; creating a first measurement value set by quantifying the human face included in the image; providing the first measurement value set to an analysis server; receiving, from the analysis server, a basic model corresponding to an animal classification that is selected by the analysis server based on the provided first measurement value set and a database configured to store a second measurement value set created by analyzing an animal image and by quantifying an animal face in the animal image; and sharing a final model corresponding to the basic model with the user terminal to provide an animal-shaped avatar corresponding to the human face.

The creating of the first measurement value set may include extracting measurement values with respect to facial components of the human face, and the second measurement value set may be created at the analysis server by extracting measurement values with respect to facial components of the animal face.

The animal classification may include n animal classifications corresponding to m second measurement value sets selected in descending of similarity by comparing, by the analysis server, the first measurement value set and the second measurement value set stored in the database, each of n and m denoting a natural number, and the basic model may include n basic models corresponding to the n animal classifications, respectively.

The sharing the final model may include creating the final model by synthesizing the n basic models.

The second measurement value set for the basic model may be modified at the analysis server based on the first measurement value set, and the basic model may be customized according to the human face based on the modified second measurement value set.

The sharing may include providing the final model to the user terminal over a network, and the user terminal may express an animal avatar by rendering the final model.

According to an aspect of an example embodiment, there is provided a non-transitory computer-readable record medium storing instructions that, when executed by a processor, cause the processor to computer-implement an avatar creation method in conjunction with a computer, the avatar creation method including: creating or selecting an image that includes a human face; providing the image to a server over a network; receiving, from the server, an animal model that is selected based on comparison between a first measurement value set created by quantifying the human face included in the image and a second measurement value set created by quantifying an animal face included in an animal image; and displaying, on a screen, an animal avatar created by rendering the received animal model.

The animal model may include a model customized from a basic model according to the human face by modifying a numerical value corresponding to the basic model based on the second measurement value set, the basic model being selected through comparison between the first measurement value set and the second measurement value set.

The animal model may be created by synthesizing n basic models selected by comparing the first measurement value set and the second measurement value set.

The server may be configured to create a plurality of second measurement value sets respectively corresponding to a plurality of animal images, each of which includes a corresponding animal face, by quantifying the corresponding animal face, to build a database by storing each of the plurality of second measurement value sets in association with a plurality of animal classifications, respectively, and to create a basic model for each of the plurality of animal classifications.

The animal model may be created based on the basic model, and the basic model may be created at the server for each animal classification based on the second measurement value set.

BRIEF DESCRIPTION OF THE FIGURES

The above and/or other aspects will be more apparent by describing certain example embodiments, with reference to the accompanying drawings, in which.

DETAILED DESCRIPTION

Figure 1:
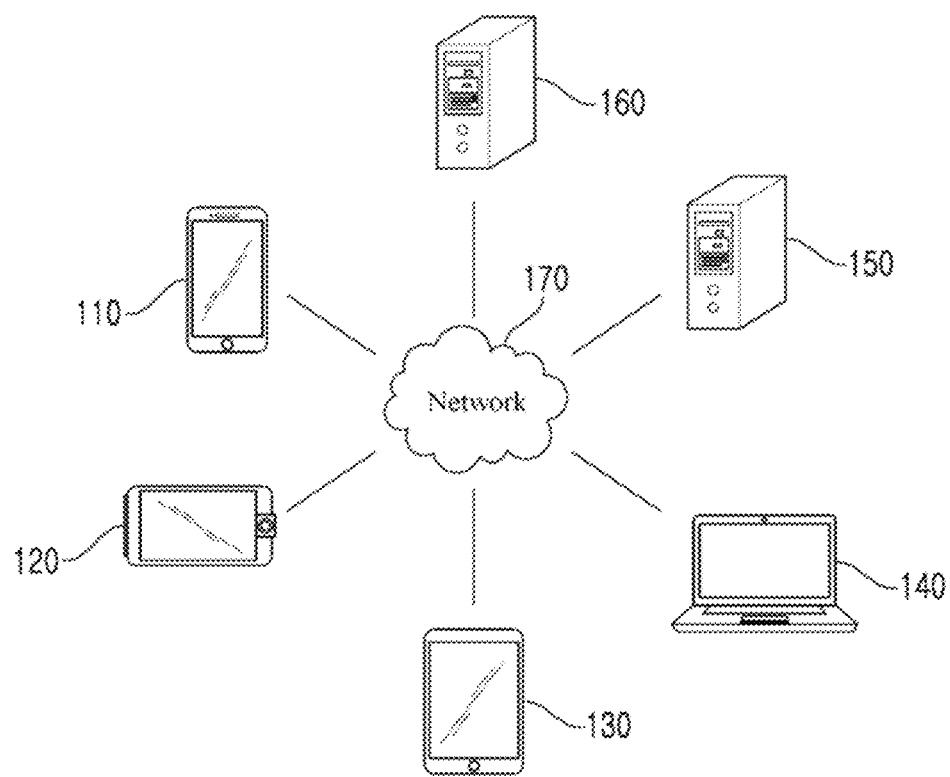
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments are described with reference to the accompanying drawings.

An avatar creation method according to example embodiments may be implemented by at least one computer apparatus, such as an electronic device, which is described below. Here, a computer program according to example embodiments may be installed and executed on the computer apparatus, and the computer apparatus may perform the avatar creation method under control of the executed computer program. The computer program may be stored in a computer-readable storage medium to execute the avatar creation method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a stationary terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a content providing service, a social network service, a messaging service, a search service, and a mail service) to the plurality of electronic devices 110, 120, 130, and 140 connected over the network 170.

Figure 2:
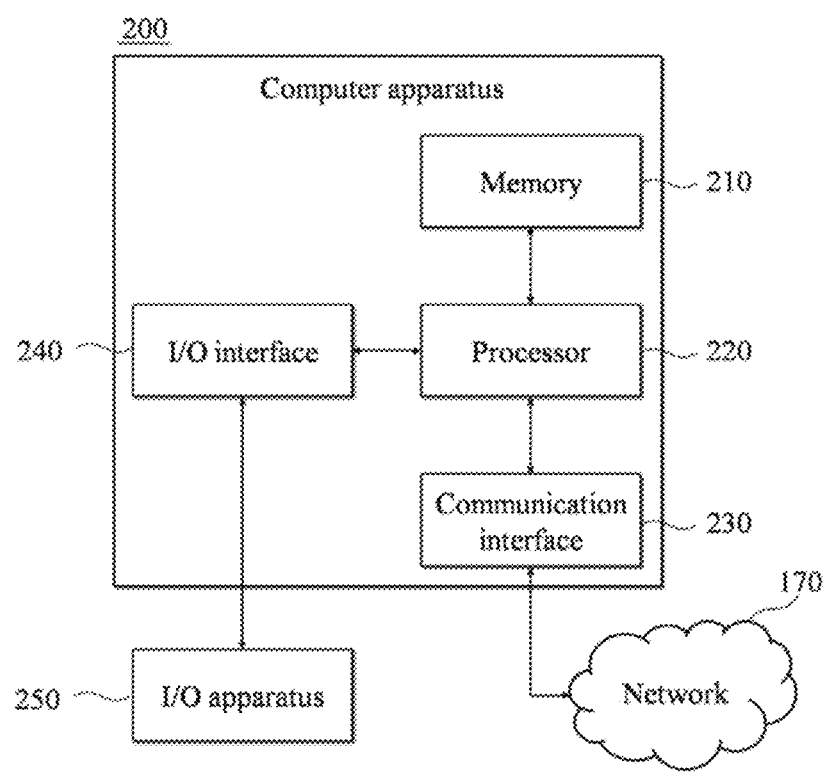
FIG. 2 is a diagram illustrating an example of a computer apparatus according to at least one example embodiment.

FIG. 2 is a block diagram illustrating an example of a computer apparatus according to at least one example embodiment. For example, each of the plurality of electronic devices 110, 120, 130, and 140 or each of the plurality of servers 150 and 160 may be implemented using a computer apparatus 200 of FIG. 2. For example, a computer program according to an example embodiment may be installed and executed on the computer apparatus 200. The computer apparatus 200 may perform an avatar creation method according to example embodiments under control of the executed computer program.

Referring to FIG. 2, the computer apparatus 200 may include a memory 210, a processor 220, a communication interface 230, and an input/output (I/O) interface 240. The memory 210 may include a permanent mass storage device, such as random access memory (RAM), read only memory (ROM), and a disc drive, as a non-transitory computer-readable storage medium. Here, the permanent mass storage device, such as RAM, ROM and disc drive, may be included in the computer apparatus 200 as a separate permanent storage device different from the memory 210. Also, an operating system (OS) and at least one program code may be stored in the memory 210. Such software components may be loaded from another non-transitory computer-readable storage medium to the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, the software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may provide a function of communication between the computer apparatus 200 and another apparatus, for example, another one of the aforementioned electronic devices 110, 120, 130, and 140 or servers 150 and 160, over the network 170. For example, the processor 220 of the computer apparatus 200 may transfer data, a file, a request or an instruction created based on the program code stored in the storage device, such as the memory 210, etc., to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used to interface with an I/O apparatus 250. For example, an input device may include a device, such as a microphone, a keyboard, and a mouse, and an output device may include a device, such as a display device and a speaker. As another example, the I/O interface 240 may be a device to interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components which is greater than or less than a number of components shown in FIG. 2. For example, the computer apparatus 200 may include at least a portion of the I/O apparatus 250, or may further include other components, for example, a transceiver, a database (DB), and the like.

Figure 3:
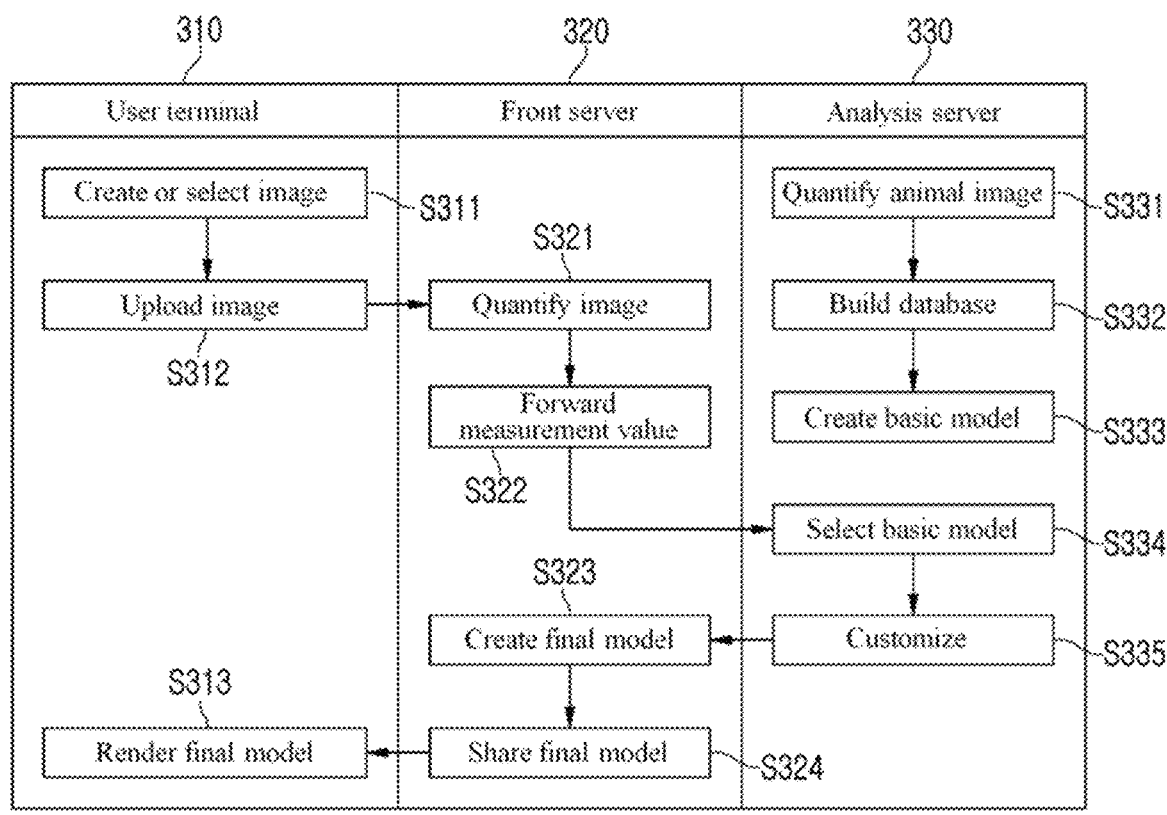
FIG. 3 illustrates an example of an avatar creation method according to at least one example embodiment.

FIG. 3 illustrates an example of an avatar creation method according to at least one example embodiment. Referring to FIG. 3, the avatar creation method represents an example of the entire process performed by a user terminal 310, a front server 320, and an analysis server 330. Here, the user terminal 310 may correspond to a physical device on which a computer program for the avatar creation method is installed and executed, such as, for example, one of the plurality of electronic devices 110, 120, 130, and 140, and the front server 320 and the analysis server 330 may correspond to the servers 150 and 160. As described above, each of the plurality of electronic devices 110, 120, 130, and 140 and each of the servers 150 and 160 may be implemented by the computer apparatus 200 of FIG. 2. Depending on example embodiments, the front server 320 and the analysis server 330 may be implemented by a single physical device. Alternatively, the front server 320 and/or the analysis server 330 may be implemented by at least two physical devices connected to each other.

Referring to FIG. 3, in operation S311, the user terminal 310 may create or select an image. For example, the user terminal 310 may capture an image through a camera included in the user terminal 310 or may identify an image selected by a user from among images stored in a local storage included in the user terminal 310.

In operation S312, the user terminal 310 may upload the image. For example, the user terminal 310 may transmit the image created or selected in operation S311 to the front server 320 over the network 170.

In detail, for example, the user terminal 310 may provide the user with a function of capturing an image by driving the camera or a function of selecting at least one image from among images stored in the local storage of the user terminal 310, under control of the application installed and executed on the user terminal 310.

In operation S321, the front server 320 may quantify the image received form the user terminal 310. For example, the front server 320 may analyze the image received from the user terminal 310 and may quantify facial components for a human face included in the image. Quantification may be implemented, for example, by extracting measurement values for each predefined measurement item with respect to each of features predefined as a facial component. In detail, for example, each of the features predefined as a facial component may be selected from among an eye, a nose, lips, a facial shape, and the like, and each of the predefined measurement items may be selected from among an area, a ratio, an angle, a length, and the like. Depending on example embodiments, a single feature may include one or more detailed features. For example, the feature "eye" may include detailed features "left eye" and "right eye" or may include detailed features "left eye," "left eye tail," "right eye," and "right eye tail." Here, all of the measurement items based on a feature or a detailed feature may include the same measurement items, such as, for example, an area, a ratio, and an angle. Depending on example embodiments, the measurement items may vary. For example, a width and a height may be measurement items for the feature "eye" and an angle may be a measurement item for the detailed feature "left eye tail." Measurement values calculated as a measurement item may be measured as relative values according to a standard compared to values of an actual physical unit. For example, a width of an eye and a distance between eyes may be calculated as a relative value to a width of a face and a height of an eye may be calculated as a relative value to a height of the face. Measurement values may form a set of a plurality of values (hereinafter, "measurement value set") extracted for each feature/each measurement item.

In operation S322, the front server 320 may forward measurement values to the analysis server 330. For example, the front server 320 may transmit, to the analysis server 330, a measurement value set extracted by quantifying the image in operation S321.

In operation S331, the analysis server 330 may quantify an animal image. For example, the analysis server 330 may quantify an animal face included in the image in the same manner as that of quantifying, by the front server 320, the human face included in the image in operation S321. For example, the analysis server 330 may quantify the animal image by creating a measurement value set by extracting measurement values for each predefined measurement item, with respect to each of features of the animal face predefined as a facial component. Also, deep learning may be used to classify types of animals included in animal images. For example, the analysis server 330 may create animal classifications for animals derived from a plurality of animal images using a deep learning model, such as, for example, a convolutional neural network (CNN) trained to analyze an input animal image and to classify a type of an animal included in the animal image.

In operation S332, the analysis server 330 may build a database. For example, the analysis server 330 may build the database to classify animals included in the animal images through the aforementioned deep learning and to store measurement value sets extracted for the respective animal classifications.

In operation S333, the analysis server 330 may create a basic model for each classified animal. For example, a basic model may be created for a dog, a basic model may be created for a cat, and a basic model may be created for a rabbit. If an animal classification is performed in detail, animals of the same species may be divided into subspecies. For example, if dogs are subclassified based on various subspecies of dogs, a basic model may be created based on each subclassification. Also, a basic model may be created for each subclassification. For example, a basic model may be created for a puppy and a basic model may be created for an adult dog. For example, a basic model may be created based on a measurement value set stored in the database. If at least two measurement value sets are stored in the database in association with a single animal classification, an average value of elements corresponding to each other in the at least two measurement value sets may be calculated and the basic model may be created based on a set of the calculated average values.

Operations S331 through S333 may be performed prior to operations S311, S312, S321, and S322, or in parallel with operations S311, S312, S321, and S322.

In operation S334, the analysis server 330 may select the basic model. For example, the analysis server 330 may sequentially compare the measurement value set received from the front server 320 to measurement value sets stored in the database and may determine most similar m measurement value sets and may determine n animal classifications corresponding to the m measurement value sets. Here, each of n and m denotes a natural number. That is, the analysis server 330 may determine an animal classification corresponding to the human face by receiving a measurement value set created by quantifying the human face and by comparing the received measurement value and the measurement value sets stored in the database. If at least two measurement value sets corresponding to the same animal classification are present among the m measurement value sets, a number of animal classifications may be equal to or less than a number of the determined measurement value sets because a single animal classification is determined with respect to the corresponding at least two measurement value sets. Also, the analysis server 330 may select n basic models corresponding to the determined n animal classifications. Depending on example embodiments, the analysis server 330 may select and provide only a single basic model using a most similar single measurement value set. The analysis server 330 may also select and provide n basic models such that the front server 320 or the user terminal 310 may select a single basic model from among the n basic models. Also, as described in the following example embodiment, a new animal model may be created by synthesizing the n basic models.

In operation S335, the analysis server 330 may customize the basic model. That is, the analysis server 330 may process the identified basic model to correspond to the human face to provide an animal-shaped avatar corresponding to the human face. For example, the analysis server 330 may customize the basic model to fit a desired human face by adjusting a value for each of items as facial components of the basic model based on the measurement value set received from the front server 320. That is, the analysis server 330 may apply one or more features of the desired human face to the basic model. Here, each of the n basic models selected in operation S334 may be customized and the customized n basic models may be forwarded to the front server 320.

Also, depending on example embodiments, customization of then basic models may be performed by the front server 320. For example, in operation S334, the analysis server 330 may transmit the selected n basic models to the front server 320. The front server 320 may customize each of the n basic models based on a numerical value calculated in operation S331. In this case, the front server 320 may customize the basic model according to the human face by modifying a numerical value corresponding to the basic model based on the measurement value set created by quantifying the human face.

In operation S323, the front server 320 may create a final model. For example, the front server 320 may create a new animal model as the final model by synthesizing the customized n basic models. As another example, the front server 320 may create each of the n basic models as the final model. The customized n basic models may be used to create the final model and may also be stored in the database with the corresponding measurement value set and may be used to create another avatar.

In operation S324, the front server 320 may share the final model. For example, the front server 320 may transmit the final model to the user terminal 310 over the network 170 and may share the created final model with the user terminal 310. That is, the front server 320 may share the basic model or the final model created based on the basic model with the user terminal 310 to provide the animal-shaped avatar corresponding to the human face. For example, the front server 320 may provide the basic model to the user terminal 310 if customizing or synthesizing is not applied and may provide the final model to which customizing or synthesizing is applied to the user terminal 310 if customizing or synthesizing is applied.

In operation S313, the user terminal 310 may render the final model. For example, the user terminal 310 may receive the animal model from the front server 320 and may process a task of displaying a modeled animal model on a screen of the user terminal 310. That is, the user terminal 310 may create and display an animal avatar corresponding to a face of the user included in the image created or selected in operation S311 by displaying, on the screen, a graphic element finally created through modelling. An image file of the animal-shaped avatar may be saved as an image on the user terminal 310. Depending on example embodiments, the user terminal 310 may provide the user with a function capable of further customizing the final model under control of an application before rendering. In this case, the user may modify regular features of the final model as desired by the user through the provided function and the finally modified animal model may be rendered by the user terminal 310 and displayed on the screen. For example, the screen may display a user interface (UI) which allows the user to modify regular features of the final model. For example, the screen may be a touchscreen.

As described above, the avatar creation method according to the example embodiment may analyze an image including a human face and may automatically create an animal-shaped avatar corresponding to the human face. Here, for the created animal-shaped avatar, a service may be provided to find an animal similar to a face of the user and to automatically create an avatar having a corresponding animal shape instead of simply applying a facial expression of the user to an already created animal avatar template.

Also, the created animal avatar may be used to create a sticker package including a plurality of sticker images through combinations of various poses, facial expressions and other effects. For example, if consecutive frames input through the camera are forwarded from the user terminal 310 to the front server 320, the front server 320 may apply measurement value sets extracted from the respective consecutive frames and may provide a service such that a facial expression or an action of the user may reflected in the animal avatar in real time. Consecutive frames of the animal avatar may be rendered by the user terminal 310 and saved as a video or animated image. The automatically created animal avatar may be used to provide various services, such as representing the user in community sites, Internet chats, shopping malls, online games, and the like. The automatically created animal avatar may also be used to represent the user in a content providing service, a social network service, a messaging service, a search service, and a mail service.

Figure 4:
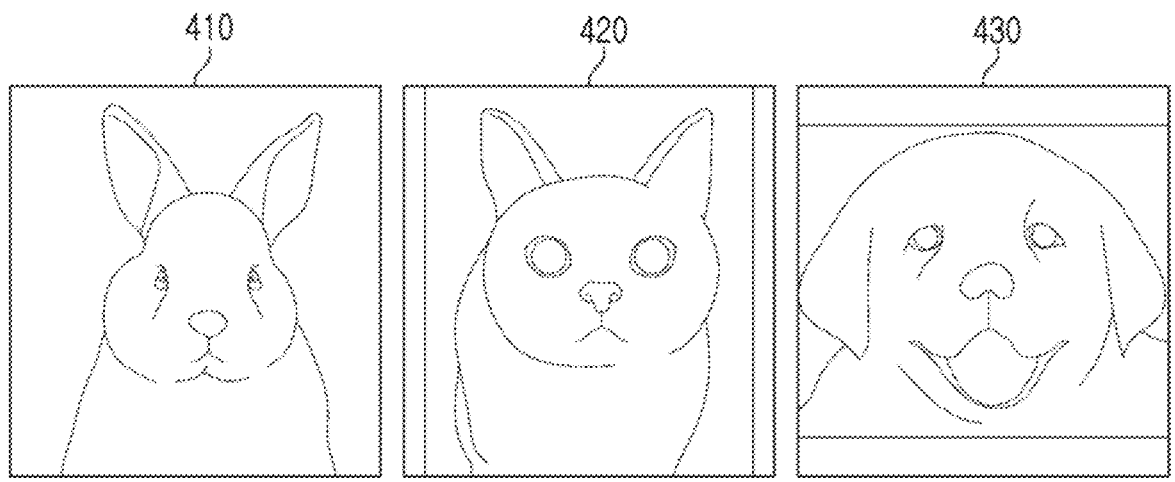
FIGS. 4 and 5 illustrate examples of image quantification according to at least one example embodiment.
Figure 4:
Figure 4:
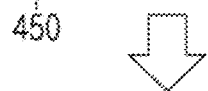
Figure 4:
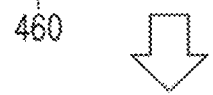
Figure 5:
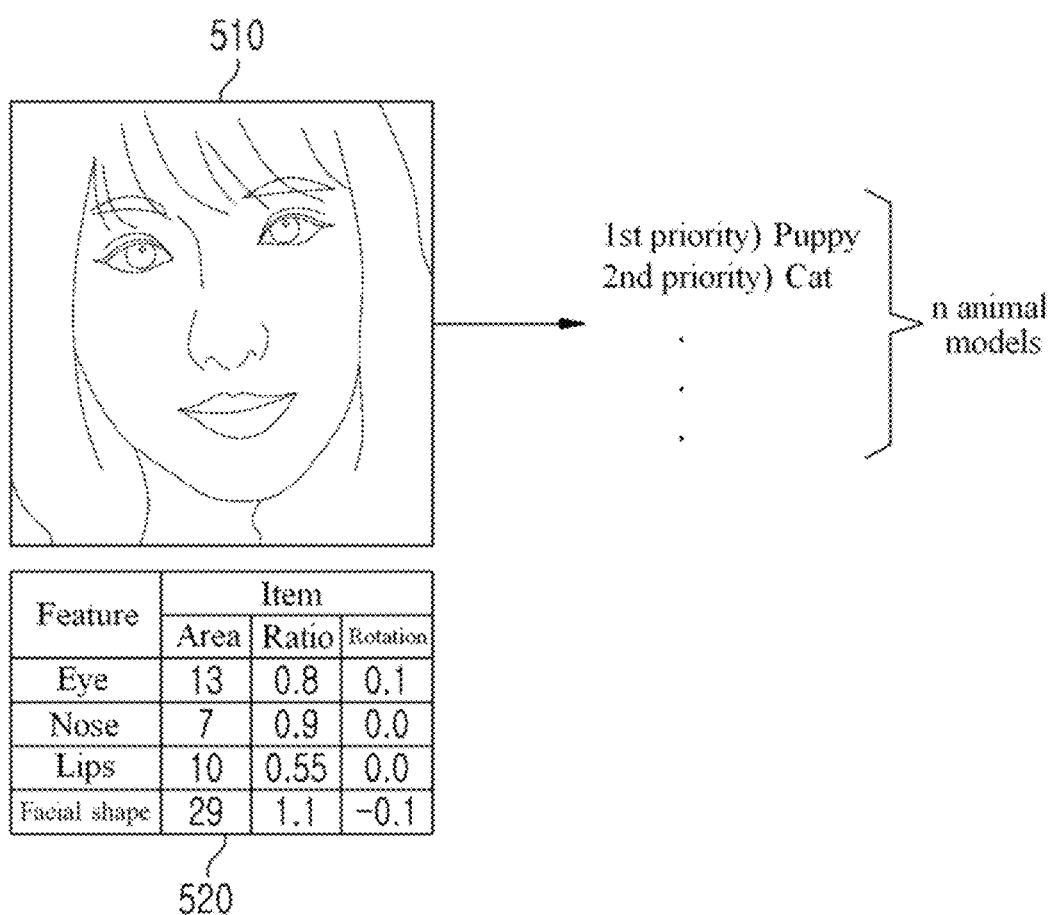

FIGS. 4 and 5 illustrate examples of image quantification according to at least one example embodiment.

As an example of animal image quantification, FIG. 4 illustrates an example of extracting, from each of a first image 410 including a face of "rabbit," a second image 420 including a face of "cat," and a third image 430 including a face of "puppy," a measurement value set that includes measurement values for each of an area, a ratio, and a rotation (angle) as an item, with respect to each of an eye, a nose, lips, and a facial shape as a feature. A measurement value set extracted from the first image 410 may be stored in a first table 440, and a measurement value set extracted from the second image 420 may be stored in a second table 450, and a measurement value set extracted from the third image 430 may be stored in a third table 460. Each extracted measurement value set may be stored in a database in association with each corresponding animal classification.

Although FIG. 4 illustrates an example of extracting a single measurement value set for a single animal, subclassification may be performed based on subspecies or a level of growth. For example, a measurement value set may be extracted for a puppy and a measurement value set may be extracted for an adult dog of the same species. A plurality of measurement value sets may be extracted for each animal classification. To this end, the analysis server 330 may analyze a plurality of animal images through deep learning, may classify animals included in the animal images, and may build the database indicating measurement value sets for each animal classification by storing at least one measurement value set in association with a corresponding animal classification for each animal classification. According to another example embodiment, at least two measurement value sets stored in the database in association with the same animal classification may be stored as a single measurement value set (hereinafter, referred to as an average measurement value set) averaging values for each element from the at least two measurement value sets. For example, if measurement values are present for an area, a ratio, and a rotation, then an average value of areas, an average value of ratios, and an average value of rotations may be calculated and stored for a corresponding animal classification.

Also, the analysis server 330 may create and manage a basic model for each animal classification. Referring to the example of FIG. 4, each of a basic model corresponding to "rabbit," a basic model corresponding to "cat," and a basic model corresponding to "puppy" may be created and managed. Such a basic model may be created based on a measurement value set or an average measurement value set of a corresponding animal classification.

As an example of human image quantification, FIG. 5 illustrates an example of extracting, from a fourth image 510 including a human face, a measurement value set that includes measurement values for each of an area, a ratio, and a rotation (angle) as an item, with respect to each of an eye, a nose, lips, and a facial shape as a feature. The extracted measurement value set may be stored in a fourth table 520 and sequentially compared to measurement value sets stored in the database.

Here, the analysis server 330 may determine n animal classifications having a measurement value set most similar to the human face included in the fourth image 510 through comparison between the measurement value sets, and may select n basic models corresponding to the determined n animal classifications. The selected n basic models may be customized by the analysis server 330 or the front server 320. The aforementioned measurement values of the fourth table 520 may be used for customizing. As described above, customizing may be additionally performed by the user terminal 310.

A basic model may be a vector for graphically implementing a corresponding animal classification. As described above, the front server 320 may create a final model by synthesizing n basic models through a weighted sum between vectors. For example, if n=2, similarity of a basic model for "puppy" may be calculated as 80%, and similarity of a basic model for "cat" may be calculated as 20%. In this case, a third vector for the final model may be created through a weighted sum between the respective elements for a first vector for the basic model for "puppy" and a second vector for the basic model for "cat." For example, if a first element of the first vector is a and a first element of the second element is b, a first element of the third vector may be calculated as (0.8a+0.2b). Here, 0.8 and 0.2 may be weights determined based on the 80% similarity corresponding to the basic model for "puppy" and the 20% similarity corresponding to the basic model for "cat", respectively. The calculated similarities of the n basic models may add up to 100%.

Depending on example embodiments, a basic model of an animal classification having a highest similarity may be determined as a final model. For example, as illustrated in FIG. 5, the analysis server 330 may select, as the final model, the basic model for "puppy" which has top priority and may forward the determined basic model for "puppy" to the front server 320. As another example, the analysis server 330 may customize each of the n basic models and may forward the customized n basic models to the front server 320. The front server 320 may communicate with the user terminal 310 such that the user may select a single basic model from among the customized n basic models.

Figure 6:
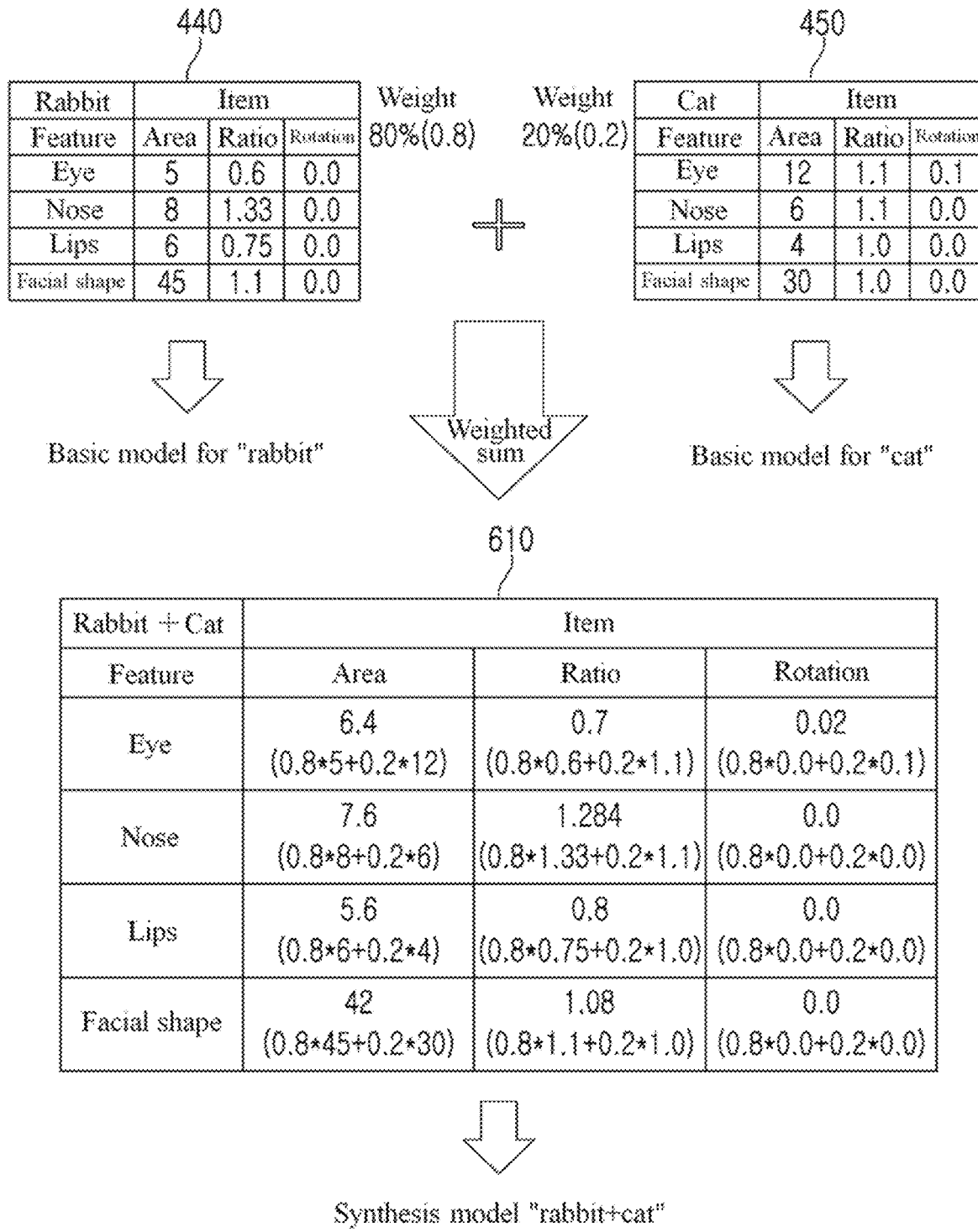
FIG. 6 illustrates an example of a model synthesis process according to at least one example embodiment.

FIG. 6 illustrates an example of a model synthesis process according to at least one example embodiment. An example of synthesizing two basic models as the basic model for "rabbit" and the basic model for "cat" of FIG. 4 are extracted is described with reference to FIG. 6. The basic model for "rabbit" may be indicated by the measurement value set stored in the first table 440 and the basic model for "cat" may be indicated by the measurement value set stored in the second table 450. Here, a similarity between a measurement value set for the face of the user and the measurement value set for "rabbit" in the first table 440 is 80% and a similarity between the measurement value set for the face of the user and the measurement value set for "cat" in the second table 450 is 20%. In this case, a measurement value set for creating a synthesis model "rabbit+cat" may be calculated and stored in a fifth table 610 of FIG. 6. Here, the front server 320 may create the synthesis model "rabbit+cat" through the calculated measurement value set and may share the created synthesis model with the user terminal 310 as the final model. Here, the synthesis model "rabbit+cat" may be a model that is newly created based on a value calculated by referring to the fifth table 610 and may be a model that is modified by applying the calculated value to the fifth table 610 based on the basic model for "rabbit" having a highest similarity.

According to some example embodiments, it is possible to analyze an image including a human face and to automatically create an animal-shaped avatar corresponding to the human face.

The systems or the apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An avatar creation method comprising:
    creating a plurality of first measurement value sets respectively corresponding to a plurality of animal images, each of which includes a corresponding animal face, by quantifying sizes, ratios, and rotation angles of animal facial features of the corresponding animal face in each of the plurality of animal images;
    storing, in a database, each of the plurality of first measurement value sets in association with a corresponding animal classification from among a plurality of animal classifications;
    creating a plurality of basic animal models respectively corresponding to the plurality of animal classifications;
    determining an animal classification, from among the plurality of animal classifications, which corresponds to a human face by computing a similarity between a second measurement value set created by quantifying sizes, ratios, and rotation angles of human facial features of the human face and each of the plurality of first measurement value sets stored in the database, and by identifying one of the plurality of first measurement value sets that is most similar to the second measurement value set;
    identifying a basic animal model from among the plurality of basic animal models which corresponds to the determined animal classification; and
    automatically processing the identified basic animal model based on the second measurement value set by modifying the sizes, the ratios, and the rotation angles of the animal facial features of the identified basic animal model according to the sizes, the ratios, and the rotation angles of the human facial features, to provide an animal-shaped avatar corresponding to the human face.

2. The avatar creation method of claim 1, wherein the creating of the plurality of first measurement value sets comprises extracting measurement values with respect to facial components of the corresponding animal face in each of the plurality of animal images, and
    wherein the second measurement value set is created by extracting measurement values with respect facial components of the human face.

3. The avatar creation method of claim 1, wherein the creating of the plurality of first measurement value sets comprises determining the animal classification corresponding to each of the plurality of animal image by inputting the plurality of animal image to a convolutional neural network (CNN), and acquiring the animal classification corresponding to each of the plurality of animal image from the CNN.

4. The avatar creation method of claim 1, wherein two first measurement value sets from among the plurality of first measurement value sets are stored in the database in association with two different animal classifications, and
wherein the creating of the plurality of basic animal models comprises determining a weighted sum of the sizes, the ratios, and the rotation angles of animal facial features corresponding to each other in the two first measurement value sets by applying different weights to the sizes, the ratios, and the rotation angles of animal facial features, and creating a synthesized basic animal model corresponding to the two different animal classifications based on the weighted sum.

5. The avatar creation method of claim 1, wherein the determining of the animal classification comprises determining n animal classifications corresponding to m measurement value sets in descending order of similarity by sequentially comparing the second measurement value set and the plurality of first measurement value sets stored in the database, each of n and m denoting a natural number, and
wherein the identifying of the basic animal model comprises identifying n basic animal models created for the n animal classifications, respectively.

6. The avatar creation method of claim 5, further comprising creating a final model by synthesizing the identified n basic animal models, and
wherein the processing the identified basic animal model comprising processing the final model to provide the animal-shaped avatar corresponding to the human face.

7. A non-transitory computer-readable record medium storing instructions that, when executed by a processor, cause the processor to perform the avatar creation method of claim 1.

8. An avatar creation method comprising:
receiving an image including a human face from a user terminal over a network;
creating a first measurement value set by quantifying sizes, ratios, and rotation angles of human facial features of the human face included in the image;
providing the first measurement value set to an analysis server connected to a database that stores a plurality of second measurement value sets respectively corresponding to a plurality of animal images;
receiving, from the analysis server, a basic animal model corresponding to an animal classification that is selected by the analysis server by computing a similarity between the first measurement value set that represents the sizes, the ratios, and the rotation angles of human facial features of the human face, and each of the plurality of second measurement value sets that are stored in the database and that represents sizes, ratios, and rotation angles of animal facial features in each of the plurality of animal images, and by identifying one of the plurality of second measurement value sets that is most similar to the first measurement value set; and
sharing a final model corresponding to the basic animal model with the user terminal to provide an animal-shaped avatar corresponding to the human face,
wherein the basic animal model received from the analysis server is automatically customized by the analysis server based on the identified second measurement value set by modifying the sizes, the ratios, and the rotation angles of the animal facial features of the basic animal model according to the sizes, the ratios, and the rotation angles of the human facial features.

9. The avatar creation method of claim 8, wherein the creating of the first measurement value set comprises extracting measurement values with respect to facial components of the human face, and
wherein the plurality of second measurement value sets are created at the analysis server by extracting measurement values with respect to facial components of an animal face included in each of the plurality of animal images.

10. The avatar creation method of claim 8, wherein the animal classification comprises n animal classifications corresponding to m second measurement value sets selected in descending of similarity by comparing, by the analysis server, the first measurement value set and the plurality of second measurement value sets stored in the database, each of n and m denoting a natural number, and
wherein the basic animal model comprises n basic animal models corresponding to the n animal classifications, respectively.

11. The avatar creation method of claim 10, wherein the sharing the final model comprises creating the final model by synthesizing the n basic animal models.

12. The avatar creation method of claim 8, wherein the identified second measurement value set for the basic animal model is modified at the analysis server based on the first measurement value set, and
wherein the basic animal model is customized according to the human face based on the modified second measurement value set.

13. The avatar creation method of claim 8, wherein the sharing comprises providing the final model to the user terminal over the network, and
wherein the user terminal expresses the animal-shaped avatar by rendering the final model.

14. A non-transitory computer-readable record medium storing instructions that, when executed by a processor, cause the processor to computer-implement an avatar creation method in conjunction with a computer, the avatar creation method comprising:
creating or selecting an image that includes a human face;
providing the image to a server over a network;
receiving, from the server, an animal model that is created by synthesizing two or more basic animal models, which are selected based on comparison between a first measurement value set created by quantifying the human face included in the image and each of a plurality of second measurement value sets created by quantifying an animal face included in each of a plurality of animal images, each of the basic animal models representing an animal face of a different animal; and
displaying, on a screen, an animal avatar created by rendering the received animal model,
wherein, in synthesizing the two or more basic animal models, different weights are applied to sizes, the ratios, and the rotation angles of animal facial features that are included in the plurality of second measurement value sets corresponding to the selected two or more basic animal models.

15. The non-transitory computer-readable record medium of claim 14, wherein the animal model is acquired by customizing a synthesized basic animal model of the two or more basic animal models, according to the human face.

16. The non-transitory computer-readable record medium of claim 14, wherein the two or more basic animal models are created at the server for each animal classification based on the identified second measurement value set.

* * * * *